United States Patent
Yli-Koski et al.

(10) Patent No.: US 9,404,591 B2
(45) Date of Patent: Aug. 2, 2016

(54) ATTACHMENT RING AND VALVE

(71) Applicant: METSO AUTOMATION OY, Vantaa (FI)

(72) Inventors: Esko Yli-Koski, Kerava (FI); Pietari Luoto, Espoo (FI); Joonas Korhonen, Vantaa (FI); Antti Kuitunen, Espoo (FI)

(73) Assignee: METSO FLOW CONTROL OY, Vantaa (FI)

( * ) Notice: Subject to any disclaimer, the term of this patent is extended or adjusted under 35 U.S.C. 154(b) by 121 days.

(21) Appl. No.: 14/362,810

(22) PCT Filed: May 27, 2013

(86) PCT No.: PCT/FI2013/050578
§ 371 (c)(1),
(2) Date: Jun. 4, 2014

(87) PCT Pub. No.: WO2013/178877
PCT Pub. Date: Dec. 5, 2013

(65) Prior Publication Data
US 2014/0332704 A1    Nov. 13, 2014

(30) Foreign Application Priority Data

May 28, 2012 (FI) .................................. 20125573

(51) Int. Cl.
*F16K 5/06* (2006.01)
*F16L 25/06* (2006.01)
(Continued)

(52) U.S. Cl.
CPC ............... *F16K 5/0605* (2013.01); *F16B 21/18* (2013.01); *F16K 1/224* (2013.01); *F16K 1/225* (2013.01); *F16K 51/00* (2013.01); *F16L 25/065* (2013.01); *F16B 21/183* (2013.01); *F16L 55/136* (2013.01)

(58) Field of Classification Search
CPC ........... F16K 1/225; F16K 5/00; F16K 51/00; F16K 1/224; F16K 5/0605; F16B 21/18; F16B 21/183; F16L 7/00; F16L 13/147; F16L 13/166; F16L 25/065; F16L 25/14; F16L 55/136

USPC .............................. 251/125, 127; 403/DIG. 7
See application file for complete search history.

(56) References Cited

U.S. PATENT DOCUMENTS 2,616,587 A * 11/1952 Petch .................. F02F 1/00
                                                    114/22
4,226,263 A    10/1980 Muchow
(Continued)

FOREIGN PATENT DOCUMENTS

DE            878125 C    6/1953
GB            349329 A    5/1931
(Continued)

OTHER PUBLICATIONS

Feb. 26, 2013 Finnish Search Report issued in Finnish Application No. 20125573.
(Continued)

*Primary Examiner* — John K Fristoe, Jr.
*Assistant Examiner* — Richard K Durden
(74) *Attorney, Agent, or Firm* — Oliff PLC (57) ABSTRACT

The invention relates to an attachment ring for attaching an object in a flow channel. The attachment ring has a first surface for contacting the object and a second surface for contacting a surface of a shoulder. An expansion member expands the attachment ring by pushing the ends away from each other when the expansion member is moved into the opening. At least one of the second surface of the attachment ring and the surface of the shoulder is inclined in order to wedge the attachment ring between the surface of the shoulder and the object when the attachment ring is expanded by the expansion member.

7 Claims, 5 Drawing Sheets

(51) Int. Cl.
  *F16K 1/22* (2006.01)
  *F16K 51/00* (2006.01)
  *F16L 55/136* (2006.01)
  *F16B 21/18* (2006.01)

(56) References Cited

U.S. PATENT DOCUMENTS

| | | | | |
|---|---|---|---|---|
| 4,343,581 A | * | 8/1982 | Millheiser | F16B 21/18 411/353 |
| 4,467,823 A | * | 8/1984 | Shaffer | F16K 5/0642 137/15.18 |
| 4,846,221 A | * | 7/1989 | Kanemaru | F16K 5/0605 137/514 |
| 5,180,139 A | * | 1/1993 | Gethmann | F16K 5/0605 137/625.32 |
| 5,937,890 A | | 8/1999 | Marandi | |
| 5,988,586 A | | 11/1999 | Boger | |

FOREIGN PATENT DOCUMENTS

| | | |
|---|---|---|
| GB | 1 514 690 | 6/1978 |
| JP | A-2008-169947 | 7/2008 |
| WO | WO 2011/145562 | 11/2011 |

OTHER PUBLICATIONS

Sep. 18, 2013 Written Opinion issued in International Application No. PCT/FI2013/050578.
Sep. 18, 2013 International Search Report issued in International Application No. PCT/FI2013/050578.
Nov. 4, 2015 Extended European Search Report issued in Patent Application No. 13796362.5.

* cited by examiner

ATTACHMENT RING AND VALVE

BACKGROUND OF THE INVENTION

1. Field of the Invention

This invention relates to an attachment ring for securing an object in a flow channel of a valve and to a valve having such an attachment ring.

2. Description of Prior Art

Previously there is known a locking ring with an opening breaking the periphery of the ring. Due to this opening the ring may be compressed to have a smaller diameter during mounting. Once the compressed ring has been mounted into a groove in the circumferential wall of the flow channel, the ring may be released such that it expands and locks into the groove.

A problem with the above described known solution is lack of reliability. If the locking ring does not secure the object sufficiently firmly in the flow channel, fluid passing through the flow channel may cause vibration of the object and/or the locking ring. Vibrating parts will generate noise, which should be avoided. Additionally, the vibrating parts may eventually be damaged to such an extent that they break apart and some of the parts may be carried along the fluid flowing through the flow channel.

Depending on the implementation, external objects (such as parts of the locking ring) in the flowing fluid may cause serious damage or problems for other devices, and must therefore be avoided.

SUMMARY OF THE INVENTION

An object of an embodiment of the present invention is to solve the Above mentioned drawback and to provide a new solution for securing an object in a flow channel of a valve. This object is achieved with the attachment ring according to the following disclosure.

The use of an expandable attachment ring, in combination with a suitable shaping of the attachment ring, the object and/or a shoulder in the flow channel, makes it possible to secure the object rigidly and reliably by wedging the attachment ring between the shoulder and the object to be attached.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
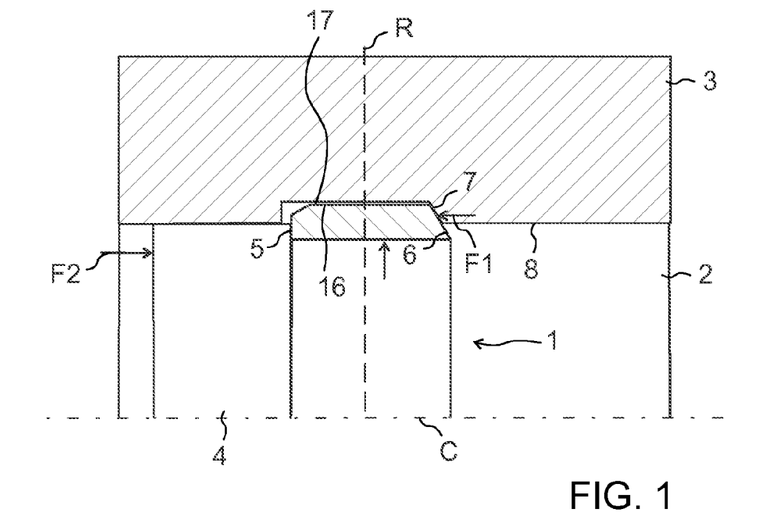
FIGS. 1 and 2 illustrate an attachment ring.
Figure 2:
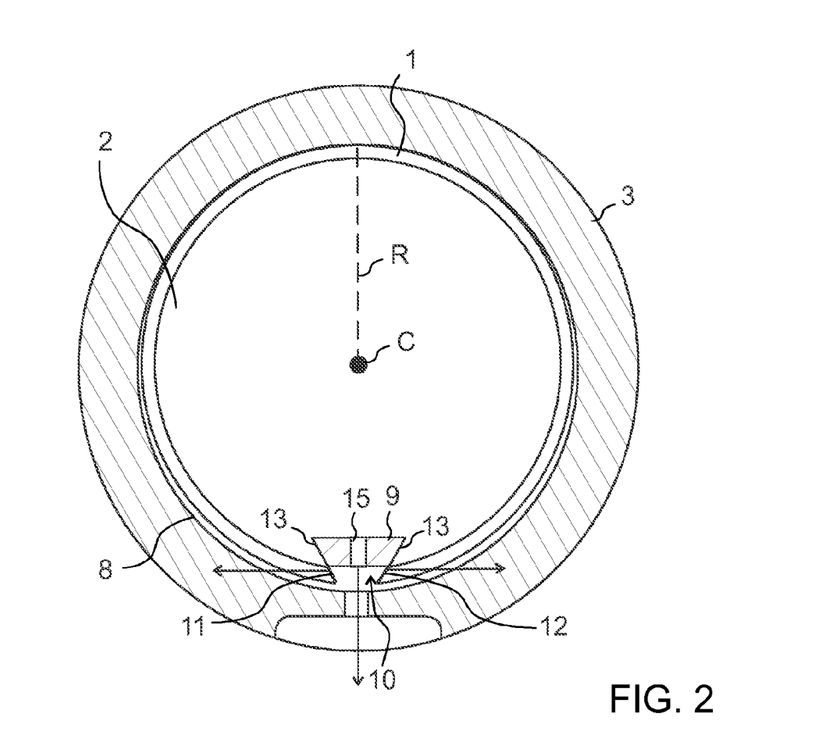

FIG. 1 is a partial cross section of an attachment ring 1 arranged in a flow channel 2 of a valve 3 and FIG. 2 illustrates a cross section of the wall of the flow channel of FIG. 1 as viewed in the axial direction of the attachment ring.

In FIG. 1, an object 4 is secured in the flow channel 2 by an attachment ring 1. The attachment ring 1 has a first surface 5, which in the illustrated example is an axial surface, contacting the object 4 and a second surface 6, which in the illustrated example is an axial surface, contacting a surface 7 of a shoulder in a circumferential wall 8 of the flow channel 2. At least one of the second surface 6 of the attachment ring 1 and the surface of the shoulder 7 is inclined in order to wedge the attachment ring 1 between the surface 7 of the shoulder and the object 4 when the attachment ring 1 is expanded. Such inclination may be obtained by a planar inclined surface or a curved surface having a large radius, for instance.

In the illustrated example of FIG. 1, both the surface of the shoulder 7 and the second surface 6 are similarly inclined (with the same inclination), but in some implementation it may be sufficient that only one of these surfaces has the illustrated inclination. In that case it may be sufficient that only the second surface 6 of the attachment ring 1 is inclined such that the distance between the first surface 5 and the second surface 6 increases while moving in the radial direction R of the attachment ring towards a center axis C of the attachment ring.

An expansion member 9 is arranged in an opening 10 breaking the periphery of the attachment ring 1. The expansion member 9 and the ends 11 and 12 of the ring 1 which are located on opposite sides of the opening 10 are mutually shaped to expand the attachment ring 1 by pushing the ends 11 and 12 away from each other when the expansion member is moved into the opening 10, as illustrated by an arrow in FIG. 2. In the illustrated example the expansion member 9 has side surfaces 13 facing the ends 11 and 12 of the attachment ring 1. These side surfaces 13 are inclined such that the distance between the side surfaces 13 decreases while moving away from the center axis C of the attachment ring 1. Additionally, in the illustrated example, the ends 11 and 12 of the attachment ring which are located on opposite sides of the opening 10 are inclined (with the same inclination as the side surfaces 13) such that the distance between the ends 11 and 12 decreases while moving away from the center axis C of the attachment ring 1 in the radial direction R. However, in some implementation it may be sufficient that only one side surface 13 of the expansion member or one of the ends 11 and 12 has the illustrated inclination.

In the illustrated example, the expansion member 9 also has a hole 15 for a screw 14 (such as a bolt) engaging the expansion member 9, as illustrated in FIGS. 3a to 3d. For this purpose the hole 15 may be threaded. Alternatively, in some implementations the screw may be pushed from the inside of the attachment ring through the expansion member 9 and engaged by a nut on the outside of the flow channel 2 or by a thread in a cavity in the wall of the flow channel 2. Still another alternative that the screw is a fixed and integrated part of the expansion member 9 such that it penetrates through a hole in the wall of the flow channel 2 and is engaged by a nut on the outside of the flow channel. In any case, the expansion member 9 may be moved into the opening 10 by a force generated by turning the screw 14 (or the nut). Consequently, the ends 11 and 12 of the attachment ring 1 are pushed away from each other making the ring 1 expand.

A screw 14 is, however, not necessary in all embodiments in order to expand the attachment ring. Instead it is possible to utilize a separate tool which expands the attachment ring such that the ends 11 and 12 move away from each other. Once expanded the expansion member 9 may be arranged in place and finally secured in place by welding (or a screw), for instance. Such welding may attach the expansion member to the ends 11 and 12, or alternatively to the object to be attached. In an implementation like this, the expansion member is only utilized for keeping the attachment ring in the expanded position. Also in such an implementation it is advantageous that at least one of the surfaces 13 of the expansion member 9 or at least one of the surfaces of the ends 11 and 12 is inclined, to ensure that the expansion member exactly matches the size of the opening 10 once it is moved deep enough into the opening between the ends 11 and 12.

In order to allow the diameter of the attachment ring 1 to increase as the attachment ring 1 expands, a gap 17 is provided between the (radial) upper surface 16 of the attachment ring 1 and the surrounding circumferential wall 8. Due to this, the attachment ring 1 may expand and the second surface 6 comes into contact with the surface 7 of the shoulder. This contact generates a force F1 pushing the attachment ring 1 towards the object 4 to be secured. On the opposite side of the object 4 a shoulder, a support or another object for instance (not shown in FIG. 1), may prevent the object 4 from being moved to the left in FIG. 1. Consequently, a counterforce F2 keeps the object 4 in place while the expansion of the attachment ring 1 continues, and eventually the attachment ring becomes wedged between the surface of the shoulder 7 and the object 4. This secures the object 4 firmly in the illustrated position.

In order to improve the attachment, the attachment ring 1, which may be circular, may be so dimensioned that its ends 11 and 12 need to be squeezed together such that the ring 1 has a smaller diameter while it is inserted into the flow channel. Once the attachment ring 1 is released, it expands to the size illustrated in FIG. 1. In that case sufficient contact between the surface 7 of the shoulder and the second surface 6 may occur already without any expansion member 9 arranged into the opening 10. One alternative to maximize the attachment force is to make the attachment ring 1 so big, in relation to the cross section of the flow channel, that it needs to be compressed to an extent which is close to the yield limit of the used material (such as steel) before it can be inserted into the flow channel.

FIGS. 3a to 3d illustrate expansion of an attachment ring. The attachment ring is similar to the one illustrated in FIGS. 1 and 2. In this example it is assumed that the object 4 to be attached in the flow channel is a reducer, such as a perforated plate, arranged in the flow channel as a noise reducer which reduces noise caused by a fluid flowing through the flow channel. Alternatively such a reducer may reduce cavitation or the amount of fluid flowing through the flow channel (by restricting the flow).

Figure 3A:
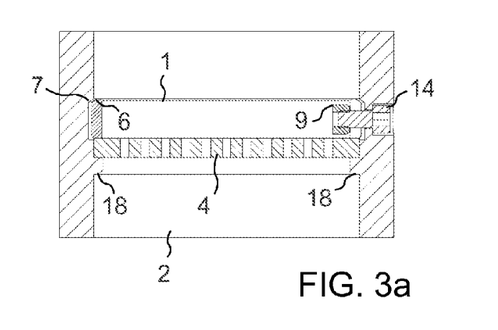
FIGS. 3a to 3d illustrate expansion of an attachment ring.
Figure 3B:
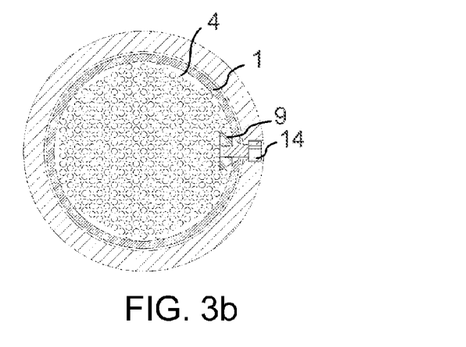

FIGS. 3a and 3b illustrate the situation after the object 4 has been introduced into the flow channel far enough in order to contact a shoulder 18 supporting the object from one direction. Additionally, the attachment ring 1 has been arranged in its place against the object 4 such that the second surface 6 contacts the surface of shoulder 7. At this stage the screw 14 has not yet been used to move the expansion member 9 into the opening of the attachment ring 1.

Figure 3C:
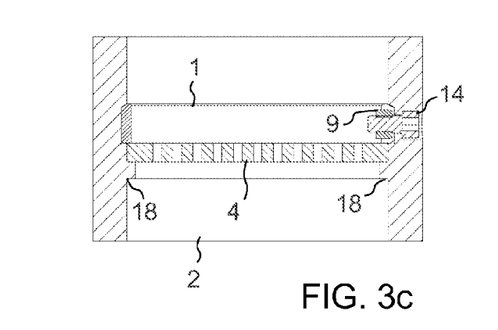
Figure 3D:
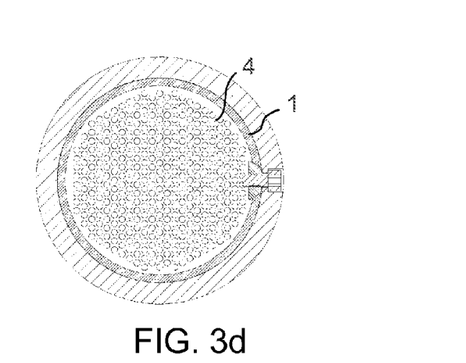

In FIGS. 3c and 3d, the screw 19 has been tightened to move the expansion member into the opening 10. Consequently, the ring 1 has expanded to such an extent that it is wedged between the surface of the shoulder 7 and the object 4.

Figure 4A:
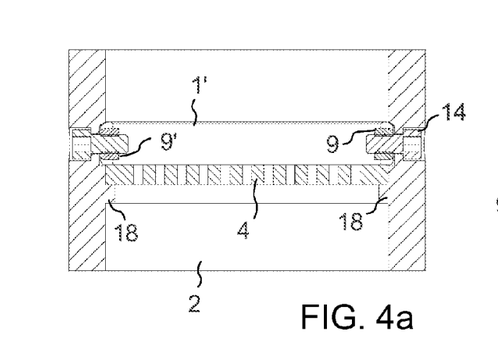
FIGS. 4a to 4b illustrate a second embodiment of an attachment ring.
Figure 4B:
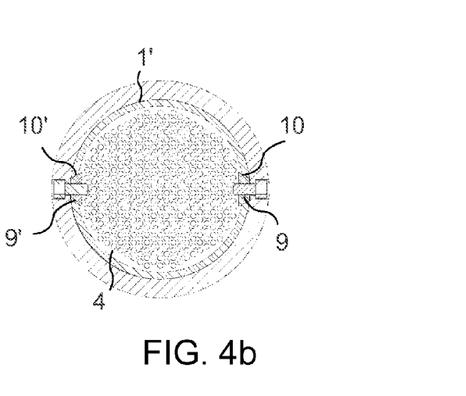

FIGS. 4a to 4b illustrate a second embodiment of an attachment ring 1. The embodiment of FIGS. 4a and 4b is very similar to the one explained in connection with FIGS. 1 to 3d. Therefore, the embodiment of FIGS. 4a and 4b will be mainly explained by pointing out the differences between these embodiments.

In the embodiment of FIGS. 4a to 4b the attachment ring 1' has at least one additional opening 10' breaking the periphery of the attachment ring. Additionally, there exists an additional expansion member 9 for each such additional opening 10' in order to expand the attachment ring at each such opening. In the illustrated example, the expansion is carried out with a screw as illustrated or alternatively by a separate tool, as has been explained in connection with the previous embodiment.

The embodiment of FIGS. 4a to 4b may be advantageous in cases where it is easier to utilize an attachment ring consisting of two or more segments, rather than of one segment only.

Figure 5:
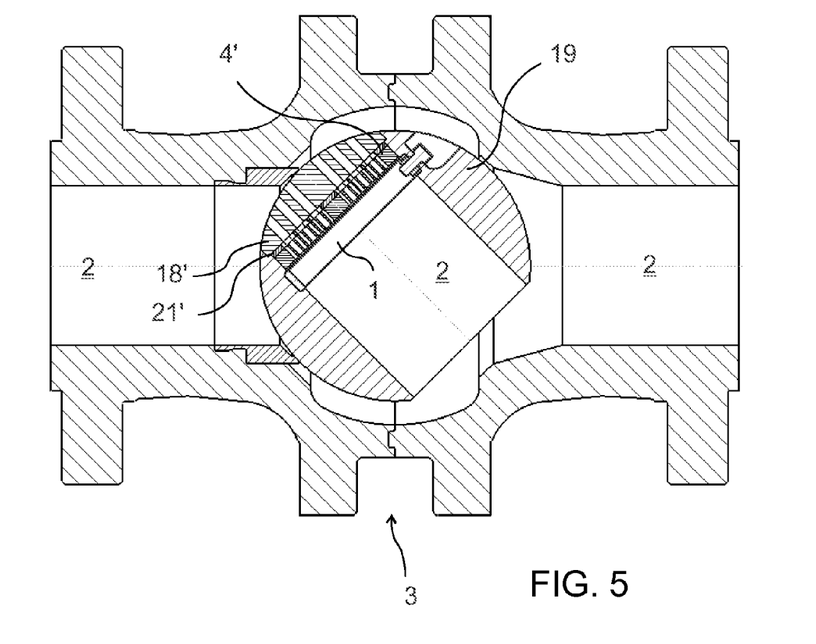
FIG. 5 illustrates a valve.

FIG. 5 illustrates a valve 3. In this example the valve has a flow channel 2 with a closure member 19, the closure member 19 being movable between a position restricting flow through the flow channel and a position allowing flow through the flow channel. In the illustrated example the valve 3 is a ball valve, however, the invention may be implemented also in other types of valves.

In FIG. 5 the closure member 19 contains a part of the flow channel 2, and the attachment ring 1 secures the object 4' in the part of the flow channel 2 which is located in the closure member 19. The object 4' may be a perforated plate which is a part of a noise reducer, for instance. The object 4' is supported from the other side by a second perforated plate 18', which may be attached to the closure member 19 by welding, for instance. Additionally, a third perforated plate 21' is arranged between the second perforated plate 18' and the object 4' in the embodiment of FIG. 5, as will be explained in more detail with reference to FIGS. 6 and 7.

Though FIG. 5 illustrates, by way of example, that the attachment ring 1 is utilized specifically in the closure member 19, it may be in some implementations advantageous to utilize the attachment ring 1 somewhere else in the flow channel 2 of the valve 3. Additionally, it is possible to utilize more than one attachment ring 1 in a single valve 3. In that case one alternative is to utilize one attachment ring 1 in the closure member 19 and another one in some other part of the flow channel 2.

Figure 6:
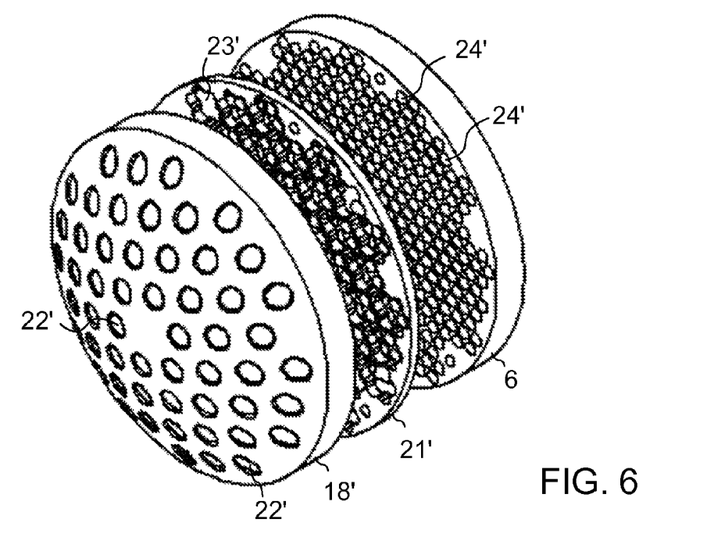
FIGS. 6 and 7 illustrate a reducer.
Figure 7:
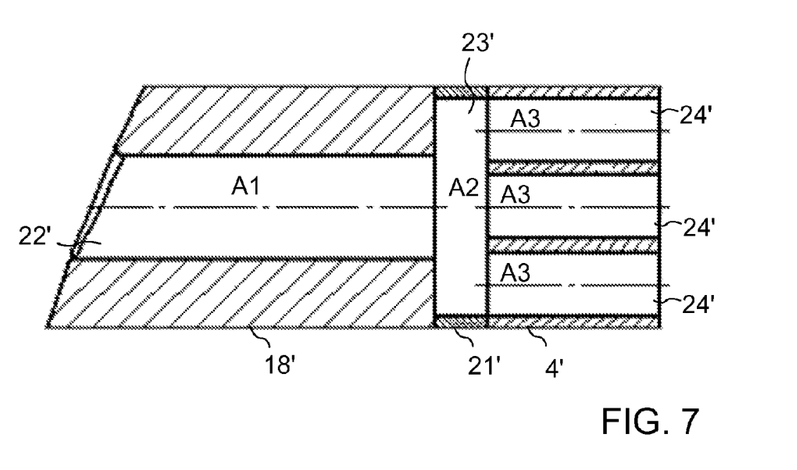

FIGS. 6 and 7 illustrate a reducer, such as a noise reducer, for instance.

The second perforated plate 18', which may be attached by welding to the closure member 19 of FIG. 5, for instance, has an inlet surface which is provided with a plurality of inlet apertures 22' for receiving a fluid flow. The third perforated plate 21', is loosely arranged against the second perforated plate 18', such that the attachment ring 1 presses the object 4' and the third perforated plate 21' towards the second perforated plate 18' in order to firmly attach the third perforated plate 18' and the object 4' in the position illustrated in FIG. 5.

The second perforated plate 18' is provided with chambers 23'. The chambers 23' have chamber-specific inlet apertures 22', i.e. each inlet aperture opens up into one chamber only, enabling fluid from a single inlet aperture to flow into one chamber only. One inlet aperture (in the illustrated example) or more inlet apertures 22' may open up into a single chamber 21'. The object 4' situated to the right in FIG. 6, is provided with a plurality of outlet apertures 24' for each chamber. The inlet and outlet apertures may be circularly round. This, however, is not necessary, but owing to the manner of manufacture, it is also feasible that the apertures have another shape.

The device of FIG. 1 is thus provided with a plurality of parallel chambers 23' into which a fluid flow arriving at the reducer is divided via the inlet apertures 22' in the inlet surface. After the reducer, the plurality of smaller fluid flows exiting the parallel chambers via the outlet apertures 24' may again unite into a uniform flow, e.g. in a pipeline or a valve in which the reducer may be arranged.

FIG. 7 illustrates a partial cross-section of the reducer shown in FIG. 6. In FIG. 7 a single chamber 23' as well as an inlet aperture 22' and outlet apertures 24' of said chamber are shown. The cross-sectional area A2 of the chamber 23' is larger than the cross-sectional area A1 of the inlet aperture 22', and each outlet aperture 24' has a smaller cross sectional area A3 than the chamber, but the sum of the cross-sectional areas A3 of the outlet apertures 24' of one chamber 23' is larger than the cross-sectional area A1 of the inlet aperture. 22'. If the cross-sectional area of the chamber is not the same over the entire length of the chamber, but the chamber is conical, for instance, the largest cross-sectional area of the chamber is larger than the cross sectional area of the inlet aperture, and each outlet aperture has a smaller cross sectional area than the larges cross-sectional area of the chamber.

If more than one inlet aperture opens up into a single chamber, the combined (sum) cross-sectional are of the outlet apertures of said chamber is larger than the combined (sum) cross-sectional area of the inlet apertures opening up into the chamber. Such an expanding cross-sectional area is necessary for restricting the flow velocity when the volume of the fluid, such as gas, expands as pressure decreases.

When a flowing fluid, such as gas, is led at a great pressure difference into a chamber 23' having a limited depth via the inlet aperture 22' or inlet apertures, and shocks of supersonic jet are then formed in the chamber 23', said shocks are not allowed to continue freely, which, in connection with vibration, would cause noise. Instead the shocks are confined to the chamber 23' wherein they are controllable, by attaching them to the surfaces, whereby the noise originally caused by free shocks can be minimized efficiently. The shocks lower the pressure level efficiently, and the formation thereof is not prevented. Only their vibration, which is a considerable noise source, is prevented by attaching them to the confined surfaces of the chamber. The fluid that has thus been received in the chamber is allowed to become discharged as smaller flows via the outlet apertures 24'. In this context, supersonic refers to a fluid flow, e.g. gas flow, whose flow velocity is higher than the speed of sound in said fluid.

Figure 8:
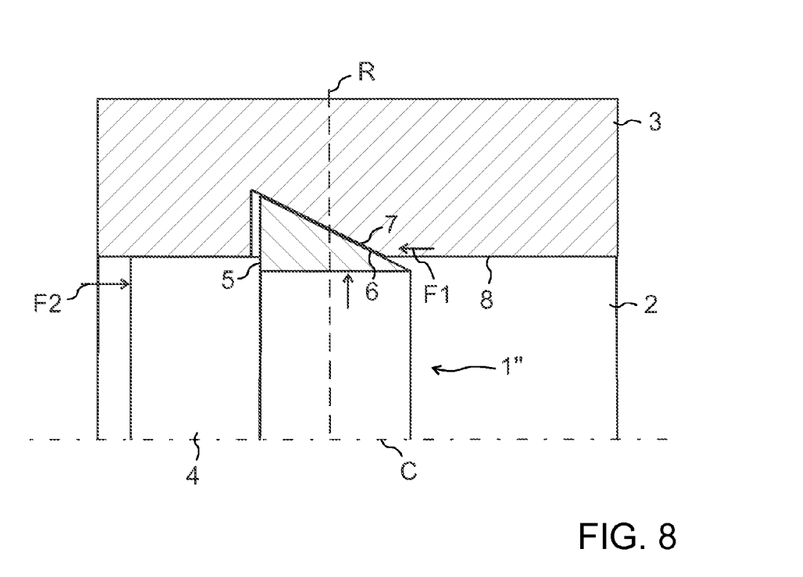
FIG. 8 illustrates a third embodiment of an attachment ring.

FIG. 8 illustrates a third embodiment of an attachment ring. The embodiment of FIG. 8 is very similar to the one described in connection with the previous Figures and therefore, the embodiment of FIG. 8 will be explained mainly by pointing out the differences.

In FIG. 8 the entire upper surface of the attachment ring 1" is inclined. Consequently, the upper surface works as the second surface 6 which contacts the surface 7 of the shoulder in the flow channel 2.

In FIG. 8 it has by way of example been assumed that both the second surface 6 of the attachment ring 1" and the surface 7 of the shoulder are inclined. However, in some embodiments sufficient wedging may be obtained though only one of these surfaces is inclined.

Figure 9:
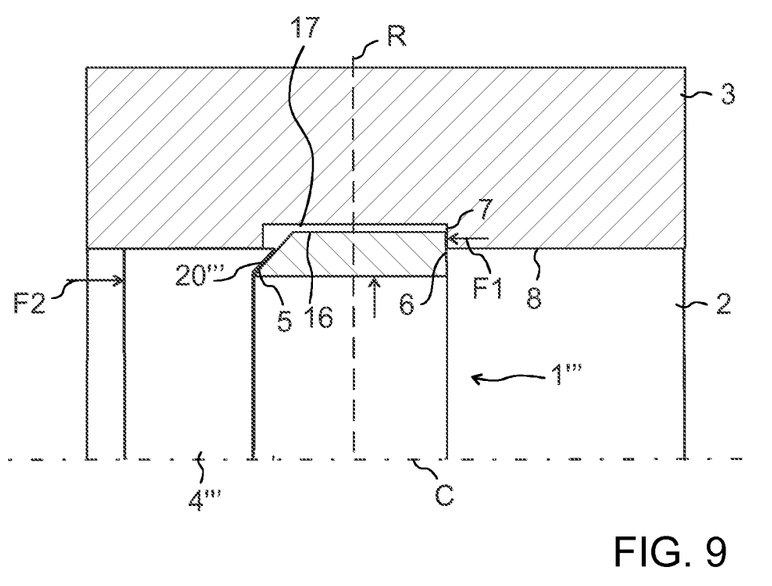
FIG. 9 illustrates a fourth embodiment of an attachment ring.

FIG. 9 illustrates a third embodiment of an attachment ring. The embodiment of FIG. 9 is very similar to the one described in connection with the previous Figures and therefore, the embodiment of FIG. 9 will be explained mainly by pointing out the differences.

In FIG. 9 a surface 20''' of the object 4''' which contacts the first surface 5 of the attachment ring 1''', is inclined. In that case no inclination is needed at the second surface 6 of the attachment ring 1''' or at the surface 7 of the shoulder, as sufficient wedging of the attachment ring 1''' between the object 4''' and the surface 7 of the shoulder can be obtained due to the inclined surface 20''' of the object 4'''.

In FIG. 9 it has by way of example been assumed that both the first surface 5 of the attachment ring 1''' and the surface 20''' of the object 4''' are inclined. However, in some embodiments sufficient wedging may be obtained though only one of these surfaces is inclined.

It is to be understood that the above description and the accompanying figures are only intended to illustrate the present invention. It will be obvious to a person skilled in the art that the invention can be varied and modified without departing from the scope of the invention.

The invention claimed is:

1. An attachment ring for securing an object in a flow channel of a valve,
   the attachment ring having a periphery and at least one opening breaking the periphery of the attachment ring so that the attachment ring has ends on opposite sides of the opening,
   the attachment ring has a first surface for contacting the object and a second surface for contacting a surface of a shoulder in a wall of the flow channel,
   the attachment ring is provided with an expansion member to be moved into the opening, the expansion member has side surfaces facing the ends of the attachment ring and a hole for a screw engaging the expansion member and attaching the expansion member to the wall of the flow channel in a position where the expansion member is positioned in the opening,
   both of the side surfaces of the expansion member are inclined such that a distance between the side surfaces decreases while moving away from a center axis of the attachment ring such that a the expansion member is shaped to expand the attachment ring by pushing the ends away from each other when the expansion member is moved into the opening, and
   at least one of the first surface of the attachment ring, the second surface of the attachment ring, a surface of the object and the surface of the shoulder is shaped to wedge the attachment ring between the surface of the shoulder and the object when the attachment ring is expanded.

2. The attachment ring according to claim 1, wherein the ends of the attachment ring located on opposite sides of the opening are inclined such that the distance between the ends decreases while moving away from a center axis of the attachment ring.

3. The attachment ring according to claim 1, wherein at least one of the first surface and the second surface of the attachment ring is inclined such that the distance between the first surface and the second surface increases while moving in the radial direction of the attachment ring towards a center axis of the attachment ring.

4. The attachment ring according to claim 1, wherein the attachment ring has at least one additional opening breaking the periphery of the attachment ring, and an additional expansion member for each such additional opening.

5. A valve comprising:
   a flow channel,
   a closure member arranged in the flow channel,
   the closure member being movable between a position restricting flow through the flow channel and a position allowing flow through the flow channel,
   an attachment ring securing an object in the flow channel by pressing it towards a support, the attachment ring has a first surface for contacting the object and a second surface for contacting a surface of a shoulder in a wall of the flow channel, the attachment ring has at least one opening breaking the periphery of the attachment ring so that the attachment ring has ends on opposite sides of the opening, and an expansion member arranged in the opening, the expansion member has side surfaces facing the ends of the attachment ring and a hole, and a screw engaging the expansion member and attaching the expansion member to the wall of the flow channel in a position where the expansion member is positioned in the opening, and wherein both of the side surfaces of the expansion member are inclined such that a distance between the side surfaces of the expansion member decreases while moving away from a center axis of the attachment ring such that the expansion member is shaped to expand the attachment ring by pushing the ends away from each other when the expansion member is moved into the opening, and at least one of the first surface of the attachment ring, the second surface of the attachment ring, a surface of the object, and the surface of the shoulder is shaped to wedge the attachment ring between the surface of the shoulder and the object when the attachment ring is expanded.

6. The valve according to claim 5, wherein the object is a reducer for reducing noise caused by a fluid flowing through the flow channel, for reducing cavitation or for reducing the amount of fluid flowing through the flow channel.

7. The valve according to claim 5, wherein the closure member contains a part of the flow channel, and that the attachment ring attaches the object in the part of the flow channel which is located in the closure member.

\* \* \* \* \*